United States Patent
Huang

(10) Patent No.: US 7,193,692 B2
(45) Date of Patent: Mar. 20, 2007

(54) LASER RANGE FINDER AND METHOD TO MEASURE A DISTANCE

(75) Inventor: Dong Huang, Hang-zhou (CN)

(73) Assignee: Asia Optical Co., Inc. (TW)

( * ) Notice: Subject to any disclaimer, the term of this patent is extended or adjusted under 35 U.S.C. 154(b) by 306 days.

(21) Appl. No.: 11/013,449

(22) Filed: Dec. 17, 2004

(65) Prior Publication Data

US 2005/0168721 A1    Aug. 4, 2005

(30) Foreign Application Priority Data

Jan. 30, 2004    (TW) ............................... 93102139 A

(51) Int. Cl.
*G01C 3/08* (2006.01)
(52) U.S. Cl. .................. 356/5.08; 356/5.01; 356/5.05; 356/5.07
(58) Field of Classification Search .............. 356/4.01, 356/5.01–5.15
See application file for complete search history.

(56) References Cited

U.S. PATENT DOCUMENTS

| | | | |
|---|---|---|---|
| 5,552,878 A | | 9/1996 | Dillard |
| 6,057,910 A | * | 5/2000 | Dunne ........................ 356/5.05 |
| 6,429,941 B1 | * | 8/2002 | Kamon et al. .............. 356/614 |
| 6,466,307 B2 | | 10/2002 | Chien |
| 6,535,275 B2 | * | 3/2003 | McCaffrey et al. ........ 356/5.08 |
| 6,657,706 B2 | * | 12/2003 | Levine et al. .............. 356/5.01 |
| 7,023,376 B1 | * | 4/2006 | Kuroda et al. ................ 342/70 |
| 2002/0036765 A1 | * | 3/2002 | McCaffrey et al. ........ 356/5.08 |

* cited by examiner

*Primary Examiner*—Thomas H. Tarcza
*Assistant Examiner*—Isam Alsomiri
(74) *Attorney, Agent, or Firm*—Rader, Fishman & Grauer PLLC

(57) ABSTRACT

A laser range finder, including a transmitter, a receiver, a timing-counting module, and a processor is provided. The transmitter transmits a laser signal toward a target, and a reflected signal is reflected from the target, whereby a real fly time is defined. The time-counting module generates a plurality of timing units to measures the real fly time to obtain a measured fly time. The processor generates a distance value based on the measured fly time.

19 Claims, 4 Drawing Sheets

LASER RANGE FINDER AND METHOD TO MEASURE A DISTANCE

CROSS REFERENCE TO RELATED APPLICATIONS

This application claims the right of priority based on Taiwan Patent Application No. 093102139 entitled "Laser Range Finder", filed on Jan. 30, 2004, which is incorporated herein by reference and assigned to the assignee herein.

FIELD OF INVENTION

The present invention relates to a laser ranger finder and a method for a laser range finder to measure a distance to a target. More particularly, the present invention relates to a pulse-type laser ranger finder and a method for a pulse-type laser range finder to measure a distance to a target.

BACKGROUND OF THE INVENTION

The operating principles of the laser range finder are divided into the pulse type and the phase type. Similar to the radio detecting and ranging (RADAR), a pulse-type laser range finder transmits a laser signal toward a target, and then the laser signal is reflected back to the laser range finder, whereby the laser finder measures the traveling time (i.e., the fly time) of the laser signal. Accordingly, the distance of the target is derived from the light speed multiplied by half of the fly time. Another, the phase-type range finder emits the laser beam which is modulated continuously to the target and then detects the variance of the phase during the traveling time. By calculating the variance of the phase during the traveling time, the phase-type laser range finder can get the distance easily.

As for the pulse-type laser range finder, the measurement accuracy depends on how to measure the fly time of laser signal. Typically, the pulse-type laser range finder includes an electronic range counter circuit to generate pulse signals at a constant frequency. By counting the pulse signals generated during the fly time, the laser range finder obtains a measured value, which is a positive integer. Thus the frequency at which the pulse signals are generated decides the measurement resolution, and the higher frequency pulse causes the higher resolution.

However, the electronic range counter circuits capable of generating high frequency pulse are costly. Therefore, other approaches to raise the resolution are introduced. For example, U.S. Pat. No. 5,552,878 discloses a vernier for a laser range finder, and more particularly an electronic vernier for increasing the resolution of a laser range finder. The vernier subdivides the clock pulses into a predetermined plurality of equal increments corresponding to respective phases of the clock pulses. Thus the fly time can be measured more accurately without higher frequency pulse. In such design, the measurement accuracy mainly depends on the resolution of the vernier.

Another approaches to raise the resolution relate to the sampling frequency and sampling times. For example, U.S. Pat. No. 6,466,307 discloses a signal processing method of a laser range signal. By setting up measurement block number and the laser emission time and then emitting a laser beam of a predetermined delay time, the accuracy of the laser range finder is enhanced with less memory used. However, this design calls for additional electronic circuits to control sampling frequencies and sampling times and to synchronize multiple electronic signals, so that it raises the cost and complicates the assembling process.

Therefore, it is desirable to have a pulse-type laser ranger finder and a method for a pulse-type laser range finder with high measurement accuracy as the same time when the maximal frequency of the pulse signals is constrained. It will be advantageous if the high measurement accuracy doesn't rely on sampling frequencies and sampling times. Also, it will be more advantageous if the laser finder and the method are able to employ the mechanical design and the manufacture process of the prior art.

SUMMARY OF THE INVENTION

The present invention achieves technical advantages as a laser range finder and a method for a laser range finder to measure a distance to a target. The laser range finder achieves high measurement precision, though the maximal frequency of the pulse signals is constrained. Another advantage is that the high measurement precision doesn't rely on sampling frequencies and sampling times nor raise the cost thereof.

Instead of increasing the utmost frequency of the pulse signals, the present invention utilizes multiple pulse frequencies to measure the fly time of laser signal. Each pulse frequency corresponds to a timing unit having a given duration. Firstly, the fly time is measured by a shorter first timing unit, and the first measurement result is obtained as M times the first timing unit. The first measurement deviation thereof is limited to a duration of the first timing unit. Thereafter, the fly time is measured by a longer second timing unit, and the second measurement result is obtained as N times the second timing unit. The second measurement deviation is limited to a duration of the second timing unit. Accordingly, the first measurement result, the first deviation, the second measurement result, and the second deviation are together taken to determine a more precise measurement result.

In one embodiment, disclosed is a laser range finder including a transmitter, a receiver, a timing-counting module, and a processor. The transmitter transmits a laser signal toward a target, and a reflected laser signal is reflected from the target. Later, the receiver receives the reflected laser signal. Hereinafter a real fly time is defined as an elapsed time from a first time point as the transmitter transmits the laser signal to a second time point as the receiver receives the reflected laser signal. The time-counting module is coupled to the transmitter and the receiver and is provided for measuring the real fly time to obtain a measured fly time. The time-counting module generates a plurality of timing units. Each timing unit corresponds to one measurement resolution. These timing units include a first timing unit and a second timing unit. The duration of the first timing unit is shorter than the duration of the second timing unit. The processor is coupled to the time-counting module and is provided for generating a distance value based on the measured fly time. The time-counting module obtains a first measured value, M, by using the first timing unit. Also, the time-counting module obtains a second measured value, N, by using the second timing unit, wherein both M and N are positive integers. When N is equal to M, and the second timing unit is longest among all the timing units of which measured values are equal to M, N times of the second timing unit is used as the measured fly time. If there is no such N equal to M, M times of the first timing unit is used as the measured fly time.

Also disclosed is a time-counting module for use in a laser range finder. The time-counting module includes a circuit for measuring the real fly time to obtain a measured fly time. The time-counting module generates a plurality of timing units. Each timing unit corresponding to one measurement resolution. These timing units include a first timing unit and a second timing unit. The first timing unit is shorter than the second timing unit. The time-counting module obtains a first measured value, M, by using the first timing unit. Also, the time-counting module obtains a second measured value, N, by using the second timing unit, wherein both M and N are positive integers. If N is equal to M, and the second timing unit is longest among all the timing units of which measured values are equal to M, N times of the second timing unit is used as the measured fly time.

Further disclosed is a method for a laser range finder to measure a distance to a target. The step (a) is to select a first timing unit and to use the first timing unit to measure the real fly time and then obtain a first measured value, M. The step (b) is to select a second timing unit. The second timing unit is longer than the first timing unit. The step (c) is to use the second timing unit to measure the real fly time and then obtain a second measured value, N. In the step (d), the step (d1) and the step (d2) are selectively performed. The step (d1) is to take N times of the second timing unit as the measured fly time when M is equal to N. The step (d2) is to take M times of the first timing unit as the measured fly time when N is equal to M, and the second timing unit is longest among all the timing units of which measured values are equal to M. Then the step (e) is to generate a distance value based on the measured fly time.

The foregoing and other features of the invention will be apparent from the following more particular description of embodiment of the invention.

BRIEF DESCRIPTION OF THE DRAWINGS

The present invention is illustrated by way of example and not intended to be limited by the figures of the accompanying drawing, in which like notations indicate similar elements.

DETAILED DESCRIPTION

Figure 1:
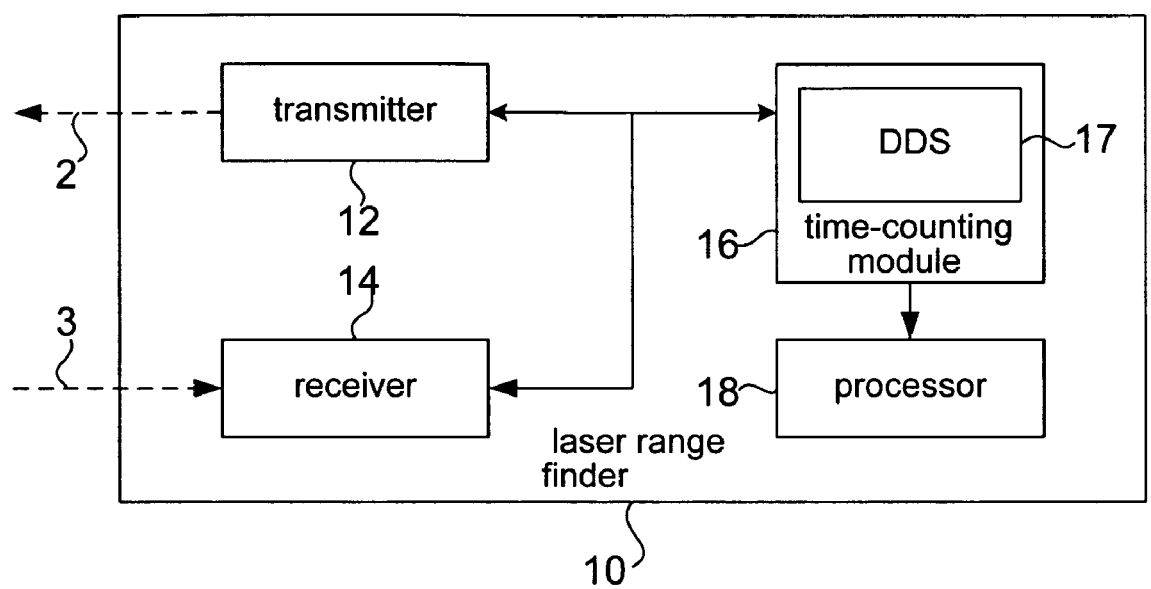
FIG. 1 is an illustration of a laser range finder 10 according to an embodiment of the present invention.

Referring to FIG. 1, the laser range finder 10 includes a transmitter 12, a receiver 14, a timing-counting module 16, and a processor 18. The transmitter 12 transmits a laser signal 2 toward a target (not shown), and a reflected signal 3 is reflected from the target and received by the receiver 14. Hereinafter a real fly time is defined as an elapsed time from a first time point as the transmitter 12 transmits the laser signal 2 to a second time point as the receiver 14 receives the reflected signal 3. The time-counting module 16 is coupled to the transmitter 12 and the receiver 14 and is provided for measuring the real fly time to obtain a measured fly time. The processor 18 is coupled to the time-counting module 16 and is provided for generating a distance value based on the measured fly time. In this embodiment, the laser signal 2 is a laser pulse. The laser range finder 10 emits a plurality of laser pulses 2 to the target to perform multiple measurements, which are averaged to maintain credibility. However, in the following descriptions, for the exemplary purposes, the real fly times of different laser pulses are regarded as being equal with respect to the same target.

When the transmitter 12 emits the laser signal 2, the time-counting module 16 starts to count time until the receiver 14 receives the reflected signal 3. Preferably, The time-counting module 16 includes a synchronization circuit (not shown), a counting circuit (not shown), and a direct digital frequency synthesis (DDS) circuit 17. The DDS 17 produces pulse signals of various frequencies for the counting circuit. Each pulse frequency corresponds to a timing unit having a predetermined duration, e.g., 1 µs, and thus each timing unit corresponds to a given measurement resolution. For example, as for the timing unit of 1 µs, the measurement result will be K times of 1 µs, where K is a positive integer.

Figure 2:
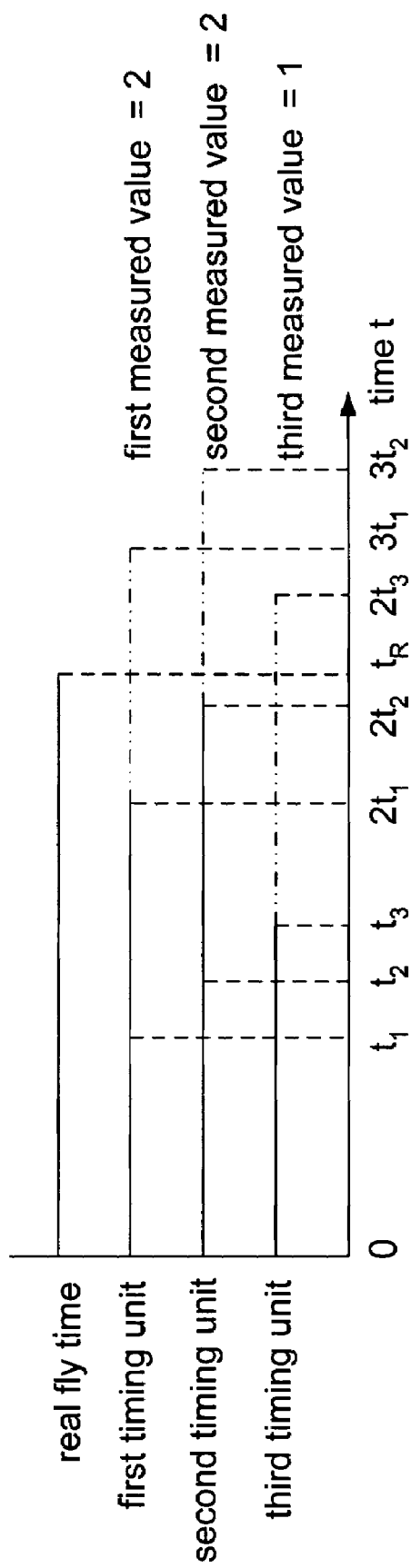
FIG. 2 is an illustration of the measurement of fly time according to an embodiment of the present invention.

Referring to FIG. 2, the real fly time is marked as $t_R$. The time-counting module 16 generates a plurality of timing units. The plurality of timing units includes a first timing unit ($t_1$), a second timing unit ($t_2$), and a third timing unit ($t_3$). As shown in FIG. 2, $t_1$ is shorter than $t_2$, and $t_2$ is shorter than $t_3$. Before $t_R$ elapsed, it undergoes two complete $t_1$. Thus when $t_R$ is measured by the first timing unit, the timing-counting module 16 obtains a first measured value, M, of 2. It also undergoes two complete $t_2$ before $t_R$ elapsed. Thus when $t_R$ is measured by the second timing unit, the timing-counting module 16 obtains a second measured value, N, of 2. However it undergoes only one complete $t_3$ before $t_R$ elapsed. Thus when $t_R$ is measured by the third timing unit, the timing-counting module 16 obtains a third measured value of 1. It is obvious that when the second measured value is equal to the first measured value, $t_2$ is longer than $t_1$, also $2t_2$ is closer to $t_R$ than $2t_1$ (as shown in FIG. 2), and thus $t_R$ is measured to be $2t_2$. In this case, the third measured value is not equal to the first measured value and so is dismissed.

In another embodiment, the time-counting module 16 takes the shortest unit among the plurality of timing units as a first timing unit. Therefore, the first timing unit corresponds a highest measurement resolution, and the measurement deviation is constrained in one $t_1$. Referring again to FIG. 2, $t_R$ falls in between $2t_1$ and $3t_1$. If there is a second timing unit having $2t_2$ lie between $2t_1$ and $t_R$, the time-counting module 16 takes $2t_2$ as the measured fly time. If there are several valid timing units having two times of each valid timing unit lie between $2t_1$ and $t_R$, the time-counting module 16 selects the longest unit among these valid timing units as the second timing unit and takes $2t_2$ as the measured fly time. If there is no valid timing unit found, the time-counting module 16 takes $2t_1$ as the measured fly time.

Figure 3:
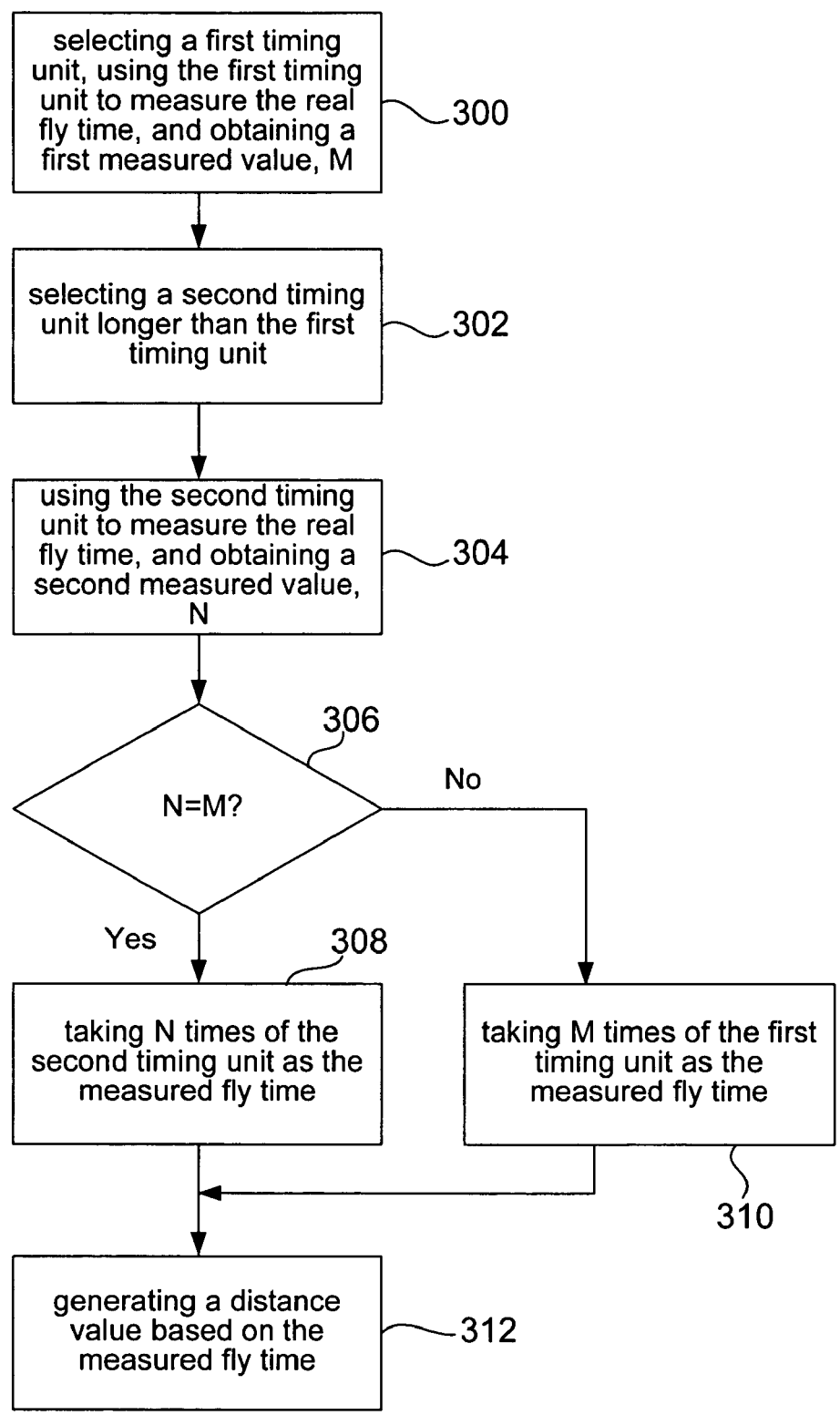
FIG. 3 is a flowchart illustrating a method according to an embodiment of the present invention.

FIG. 3 is a flowchart illustrating a method provided for the laser ranger finder 10 (shown in FIG. 1) according to an embodiment of the present invention. It begins with the step 300 selecting a first timing unit among a plurality of timing units, using the first timing unit to measure the real fly time, and obtaining a first measured value, M, wherein M is a positive integer. The step 302 is to select a second timing unit. The second timing unit is longer than the first timing unit. The step 304 is to use the second timing unit to measure the real fly time and then obtain a second measured value, N. Then the step 306 is to determine whether N is equal to M. If yes, it goes to the step 308 taking N times of the second timing unit as the measured fly time. If not, it turns to the step 310 taking M times of the first timing unit as the measured fly time. Thereafter, both the step 308 and the step 310 are followed by the step 312 generating a distance value based on the measured fly time.

For example, the real fly time, $t_R$, is assumed as 11 µs. It should be noted that, in practice, the real fly time is never exactly known, but could be measured only. When the transmitter 12 emits the laser signal 2, the time-counting module 16 starts to count time until the receiver 14 receives the reflected laser signal 3. A first timing unit, $t_1$, is assumed as 4 µs, and a second timing unit, $t_2$, is assumed as 5 µs. Before $t_R$ (11 µs) elapsed, it undergoes $2t_1$ (8 µs). Thus when $t_R$ is measured by the first timing unit, the timing-counting module 16 obtains a first measured value, M, to be 2. It also undergoes $2t_2$ (10 µs) before $t_R$ (11 µs) elapsed. Thus when $t_R$ is measured by the second timing unit, the timing-counting module 16 obtains a second measured value, N, to be 2, and selects two times of the second timing unit, i.e., 10 µs, as the measured fly time. However, if the second timing unit is assumed as 7 µs, it undergoes only one $t_2$ before the $t_R$ elapsed, and the N is obtained as 1, not equal to M. Therefore, N is dismissed for the measurement.

Figure 4:
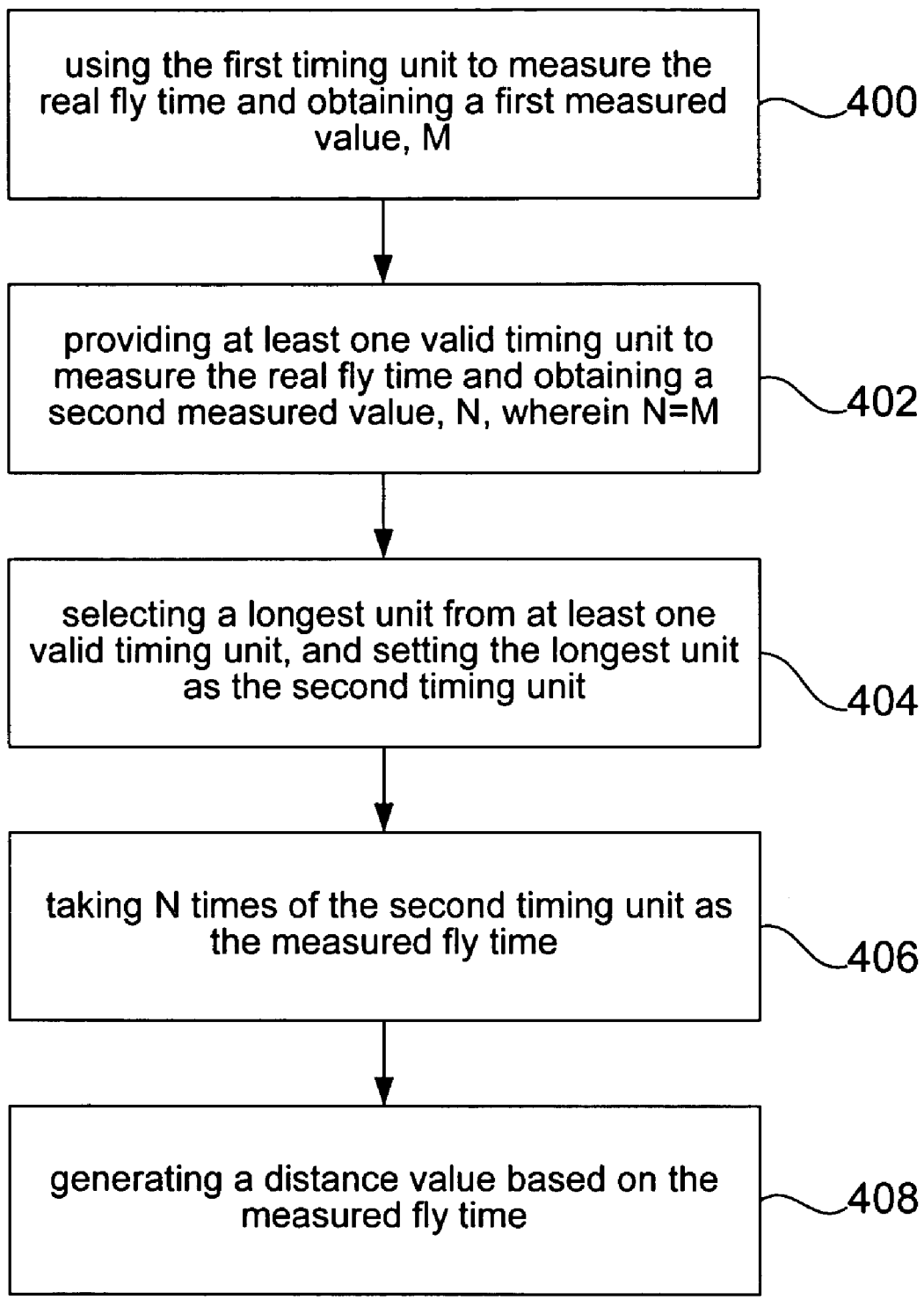
FIG. 4 is a flowchart illustrating a method according to another embodiment of the present invention.

FIG. 4 is a flowchart illustrating a method according to another embodiment of the present invention. A DDS circuit 17 generates pulse signals at a highest frequency for a shortest first timing unit. The step 400 is to use the first timing unit to measure the real fly time, and to obtain a first measured value, M, wherein M is a positive integer. Then it turns to the step 402 providing at least one valid timing unit by the DDS to measure the real fly time and obtaining a second measured value, N, wherein N is equal to M. In the step 404, a longest unit is selected from at least one valid timing unit, and setting the longest unit as the second timing unit. In the step 406, taking N times of the second timing unit as the measured fly time. Then in the step 408, a distance value is generated based on the measured fly time.

In the step 404, preferably, a longest unit is selected by using an iterative or search method. For example, the real fly time is measured by a first timing unit of 1 µs, and a first measured value is obtained to be 5. Then, the real fly time is measured by a timing unit of 1.1 µs. If the timing unit of 1.1 µs obtains a measured value to be 5, equal to the first measured value, the real fly time is measured by a timing unit of 1.2 µs on the next stage. In this case, the iterative method continues to perform until the measured value obtained is not equal to 5. The iterative method can be an iterative increment method, an iterative decrement method, or other iterative methods known to those skilled in the art. It should be noted that the real fly times of different laser pulses are regarded as being equal with respect to the same target. Therefore, the measurements by different timing units can be performed for a given laser pulse or different laser pulses.

As will be appreciated by one of ordinary skill in the art, in addition to a laser range finder and a method, the present invention may be embodied as data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. A laser range finder, comprising:
    a transmitter for transmitting a laser signal toward a target, a reflected signal being reflected from said target;
    a receiver for receiving said reflected signal, wherein a real fly time is defined as an elapsed time from a first time point as said transmitter transmits said laser signal to a second time point as said receiver receives said reflected signal;
    a time-counting module, coupled to said transmitter and said receiver, for measuring said real fly time to obtain a measured fly time, said time-counting module generating a plurality of timing units, each timing unit corresponding to one measurement resolution, said plurality of timing units comprising a first timing unit and a second timing unit, said second timing unit being longer than said first timing unit; and
    a processor, coupled to said time-counting module, for generating a distance value based on said measured fly time;
    wherein said time-counting module obtains a first measured value, M, by using said first timing unit, said time-counting module obtains a second measured value, N, by using said second timing unit, both M and N are positive integers;
    wherein, if N is equal to M, N times of said second timing unit is used as said measured fly time.

2. A laser range finder according to claim 1, wherein said first timing unit is the shortest unit among said plurality of timing units.

3. A laser range finder according to claim 2, wherein said plurality of timing units comprise a plurality of valid timing units, said time-counting module produces a plurality of measured values all equal to N based on said plurality of valid timing units, said second timing unit is the longest unit among said plurality of valid timing units.

4. A laser range finder according to claim 1, wherein said plurality of timing units comprise a plurality of valid timing units, said time-counting module produces a plurality of measured values all equal to N based on said plurality of valid timing units, said second timing unit is the longest unit among said plurality of valid timing units.

5. A laser range finder according to claim 1, wherein said time-counting module comprises a direct digital frequency synthesis (DDS) for producing said plurality of timing units.

6. A time-counting module for use in a laser range finder, said laser range finder comprising a transmitter, a receiver, and a processor, said transmitter, said receiver, and said processor all being coupled to said time-counting module;
    said transmitter transmitting a laser signal toward a target, a reflected signal being reflected from said target;
    said receiver receiving said reflected signal, wherein a real fly time is defined as an elapsed time from a first time point as said transmitter transmits said laser signal to a second time point as said receiver receives said reflected signal;
    said time-counting module comprising a circuit for measuring said real fly time to obtain a measured fly time, said time-counting module generating a plurality of timing units, each timing unit corresponding to one measurement resolution, said plurality of timing units comprising a first timing unit and a second timing unit, said second timing unit being longer than said first timing unit;

said processor generating a distance value based on said measured fly time;

wherein said time-counting module obtains a first measured value, M, by using said first timing unit, said time-counting module obtains a second measured value, N, by using said second timing unit, both M and N are positive integers;

wherein, if N is equal to M, N times of said second timing unit is used as said measured fly time.

7. A time-counting module according to claim 6, wherein said first timing unit is the shortest unit among said plurality of timing units.

8. A time-counting module according to claim 7, wherein said plurality of timing units comprise a plurality of valid timing units, said time-counting module produces a plurality of measured values all equal to N based on said plurality of valid timing units, said second timing unit is the longest unit among said plurality of valid timing units.

9. A time-counting module according to claim 6, wherein said plurality of timing units comprise a plurality of valid timing units, said time-counting module produces a plurality of measured values all equal to N based on said plurality of valid timing units, said second timing unit is the longest unit among said plurality of valid timing units.

10. A time-counting module according to claim 6, further comprising a direct digital frequency synthesis (DDS) for producing said plurality of timing units.

11. A method for a laser range finder to measure a distance to a target, said laser range finder transmitting a laser signal toward said target, a reflected signal being reflected from said target, said laser range finder receiving said reflected signal, wherein a real fly time is defined as an elapsed time from a first time point as said laser range finder transmits said laser signal to a second time point as said laser range finder receives said reflected signal, said laser range finder comprising a time-counting module, said time-counting module generating a plurality of timing units, each timing units corresponding to one measurement resolution, said method comprising:

(a) selecting a first timing unit among said plurality of timing units, using said first timing unit to measure said real fly time and obtaining a first measured value, M, wherein M is a positive integer;

(b) selecting a second timing unit among said plurality of timing units, said second timing unit being longer than said first timing unit;

(c) using said second timing unit to measure said real fly time and obtaining a second measured value, N, wherein N is a positive integer;

(d) selectively performing the (d1) and (d2) steps:
 (d1) operative if N is equal to M, taking N times of said second timing unit as said measured fly time; and
 (d2) operative if N is not equal to M, taking M times of said first timing unit as said measured fly time;

(e) generating a distance value based on said measured fly time.

12. A method according to claim 11, wherein said first timing unit is the shortest unit among said plurality of timing units.

13. A method according to claim 12, said plurality of timing units comprising a plurality of valid timing units, said time-counting module produces a plurality of measured values all equal to N based on said plurality of valid timing units, said second timing unit is the longest unit among said plurality of valid timing units.

14. A method according to claim 13, further comprising:
 (g) using an iterative method to select said second timing unit from said plurality of timing units based on said first timing unit.

15. A method according to claim 14, wherein said time-counting module comprises a direct digital frequency synthesis (DDS) for producing said plurality of timing units.

16. A method according to claim 11, wherein said plurality of timing units comprise a plurality of valid timing units, said time-counting module produces a plurality of measured values all equal to N based on said plurality of valid timing units, said second timing unit is the longest unit among said plurality of valid timing units.

17. A method according to claim 16, further comprising:
 (g) using an iterative method to select said second timing unit from said plurality of timing units based on said first timing unit.

18. A method according to claim 16, wherein said time-counting module comprises a direct digital frequency synthesis (DDS) for producing said plurality of timing units.

19. A method according to claim 11, wherein said time-counting module comprises a direct digital frequency synthesis (DDS) for producing said plurality of timing units.

* * * * *